US012696893B2

(12) United States Patent
Weimer et al.

(10) Patent No.: US 12,696,893 B2
(45) Date of Patent: Aug. 4, 2026

(54) METHOD AND DEVICE FOR CLASSIFYING PLANTS, AND COMPUTER PROGRAM PRODUCT

(71) Applicant: Robert Bosch GmbH, Stuttgart (DE)

(72) Inventors: Andreas Weimer, Gaertringen (DE); Farid Khani, Boennigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 619 days.

(21) Appl. No.: 18/247,206

(22) PCT Filed: Sep. 22, 2021

(86) PCT No.: PCT/EP2021/076013
§ 371 (c)(1),
(2) Date: Mar. 29, 2023

(87) PCT Pub. No.: WO2022/111880
PCT Pub. Date: Jun. 2, 2022

(65) Prior Publication Data
US 2023/0380404 A1 Nov. 30, 2023

(30) Foreign Application Priority Data

Nov. 26, 2020 (DE) ..................... 10 2020 214 837.6

(51) Int. Cl.
*A01M 7/00* (2006.01)
*A01M 21/04* (2006.01)
(Continued)

(52) U.S. Cl.
CPC .......... *A01M 7/0089* (2013.01); *A01M 21/04* (2013.01); *B05B 9/06* (2013.01); *G06V 10/764* (2022.01); *G06V 20/188* (2022.01)

(58) Field of Classification Search
CPC .. A01B 79/005; A01B 69/001; A01M 7/0089; A01M 21/043; A01M 21/04; B05B 9/06; G06V 10/764; G06V 20/188
See application file for complete search history.

(56) References Cited

U.S. PATENT DOCUMENTS 5,793,035 A 8/1998 Beck et al.
2019/0150357 A1* 5/2019 Wu ........................ H04N 7/188

FOREIGN PATENT DOCUMENTS

DE 4413739 A1 10/1995
DE 102017210804 A1 * 12/2018 .......... A01M 7/0089
(Continued)

OTHER PUBLICATIONS

Shrestha, D. S., Brian L. Steward, and Stuart J. Birrell. "Video processing for early stage maize plant detection." Biosystems engineering 89.2 (2004): 119-129. (Year: 2004).*
(Continued)

*Primary Examiner* — Tracy Mangialaschi
(74) *Attorney, Agent, or Firm* — NORTON ROSE FULBRIGHT US LLP

(57) ABSTRACT

A method for classifying plants. In the method, the plants or their plant components, in particular plant leaves, are detected in an evaluation region with the aid of an optical and/or infrared detection unit, and the detected image data of the detection unit are evaluated with the aid of an algorithm, via the evaluation a first plant type being distinguished from a second plant type, the second plant type being treated in particular with a medium, preferably a liquid spray, and the first plant type being planted in the form of a plant row in a tubular cultivation row tube.

13 Claims, 3 Drawing Sheets

(51) Int. Cl.
    *B05B 9/06*         (2006.01)
    *G06V 10/764*     (2022.01)
    *G06V 20/10*      (2022.01)

(56)          References Cited

FOREIGN PATENT DOCUMENTS

| | | | |
|---|---|---|---|
| DE | 102018217742 | A1 | 4/2020 |
| DE | 102018221248 | A1 | 6/2020 |
| DE | 102019211642 | A1 | 2/2021 |

OTHER PUBLICATIONS

International Search Report for PCT/EP2021/076013, Issued Jan. 7, 2022.

* cited by examiner

METHOD AND DEVICE FOR CLASSIFYING PLANTS, AND COMPUTER PROGRAM PRODUCT

FIELD

The present invention relates to a method and a device for classifying plants to allow crops to be distinguished from weeds, in particular for agricultural applications, thus allowing treatments of the plants with spray or the like to be carried out in a targeted manner as a function of the recognized plant type. Moreover, the present invention relates to a computer program product as an integral part of such a device or for carrying out the method according to the present invention.

BACKGROUND INFORMATION

A method for classifying plants is described in German Patent Application No. DE 10 2017 210 804 A1. In this method, an evaluation region in the area of a useable agricultural surface is detected with the aid of an optical and/or infrared detection unit, and the detected image data are evaluated. The objective is to recognize crops that have been planted in the form of plant rows. In the process, crops are classified as a first plant type. The classification is used to allow the crops to be distinguished from plants that are situated between the crops or the plant rows, which are classified as the second plant type, and which in particular are weeds, which are to be treated with the aid of appropriate sprays, for example.

SUMMARY

A method according to the present invention for classifying plants may have the advantage that the rate of non-classification of the second plant type is reduced, and a particularly high-quality method for classifying the plants or for detecting weeds is thus provided. In particular, second plant types, primarily those with relatively large plant components, such as leaves, are recognized more frequently. Since these plants are typically treated with an herbicide, the available space for the first plant type is thus at the same time increased as soon as the second plant type (weed) has been destroyed by the herbicide.

According to the present invention, two additional areas are placed and evaluated around a cultivated area, also referred to below as a cultivation row tube, in which the first plant type has been planted in the form of a plant row. The first additional area, which within the scope of the present invention is referred to as a neutral area, encloses the cultivation row tube in the shape of a tube. The neutral area is in turn enclosed by an area in the shape of a tube, which within the scope of the present invention is referred to as a far area. The core of the present invention is the evaluation and linking of data of the plants or plant components in the neutral area and in the far area in conjunction with the cultivation row tube to allow the vegetation present in the neutral area to be correctly assigned to the first or second plant type.

In particular, the method according to an example embodiment of the present invention provides that a neutral area that encloses the cultivation row tube in the shape of a tube at its longitudinal sides is generated around the cultivation row tube, and a far area that encloses the neutral area at its longitudinal sides, likewise in the shape of a tube, is generated around the neutral area, the plants or their plant components that are situated within the neutral area and that are associated with plants or their plant components situated within the cultivation row tube are classified as the first plant type, and plants or their plant components that extend from the cultivation row tube, across the neutral area, and up into the far area are analyzed based on further features in the far area in order to classify these plants or their plant components either as the first plant type or as the second plant type.

Advantageous refinements of the method according to the present invention for classifying plants are disclosed herein.

In particular, in one advantageous example embodiment of the method it is provided that the further features include a geometric dimension of the plants in the far area, in particular the size of a surface area covered by the plants in the far area and/or a height, and that the plants or their plant components are assigned to the first plant type when the size of the surface area and/or the height of the plants or their plant components are/is below a limiting value.

In particular to ensure that the second plant type, upon recognition as such, may be reliably treated with the medium or destroyed by same, it is provided that all plants or their plant components that are associated with plants or plant components that protrude into the far area are classified as the second plant type when the plants or their plant components that protrude into the far area are classified as the second plant type.

In a further example embodiment of the method of the present invention, this also includes that all plants or their plant components that are situated outside the cultivation row tube and that are not associated with the cultivation row tube are classified as the second plant type.

For optimally adapting the method to different circumstances, such as plants, time of year, etc., it is also advantageous for the width of the cultivated area and of the neutral area to be adapted as a function of the first plant type, the growth size, and the growth level.

With regard to the detection unit for examining image data, it is also provided that the detection unit is preferably moved in the longitudinal direction of the cultivation row tube. However, the present invention is also applicable to a movement direction of the image detection unit, which is moved at an angle to or transversely with respect to the cultivation row tube. In particular for the seamless detection of all plants or their plant components situated in the cultivation row tube, the neutral area, and the far area, it is advantageous when image data from two evaluation regions that are evaluated in succession partially overlap one another.

Moreover, the present invention also provides a device, in particular as an integral part of an agricultural vehicle, including an optical and/or infrared detection unit and a control device, as well as an evaluation device including an algorithm that is designed to carry out the described method according to the present invention.

In one refinement of such a device according to the present invention, it is provided that a spray unit including at least one selectively activatable spray nozzle for treating plants or plant components of the second plant type is additionally provided.

The present invention also provides a computer program product, in particular a data program or a data medium, that is designed to carry out at least one method step according to the present invention.

Further advantages, features, and particulars of the present invention result from the following description of preferred specific embodiments of the present invention, and with reference to the figures.

DETAILED DESCRIPTION OF EXAMPLE EMBODIMENTS

Figure 1:
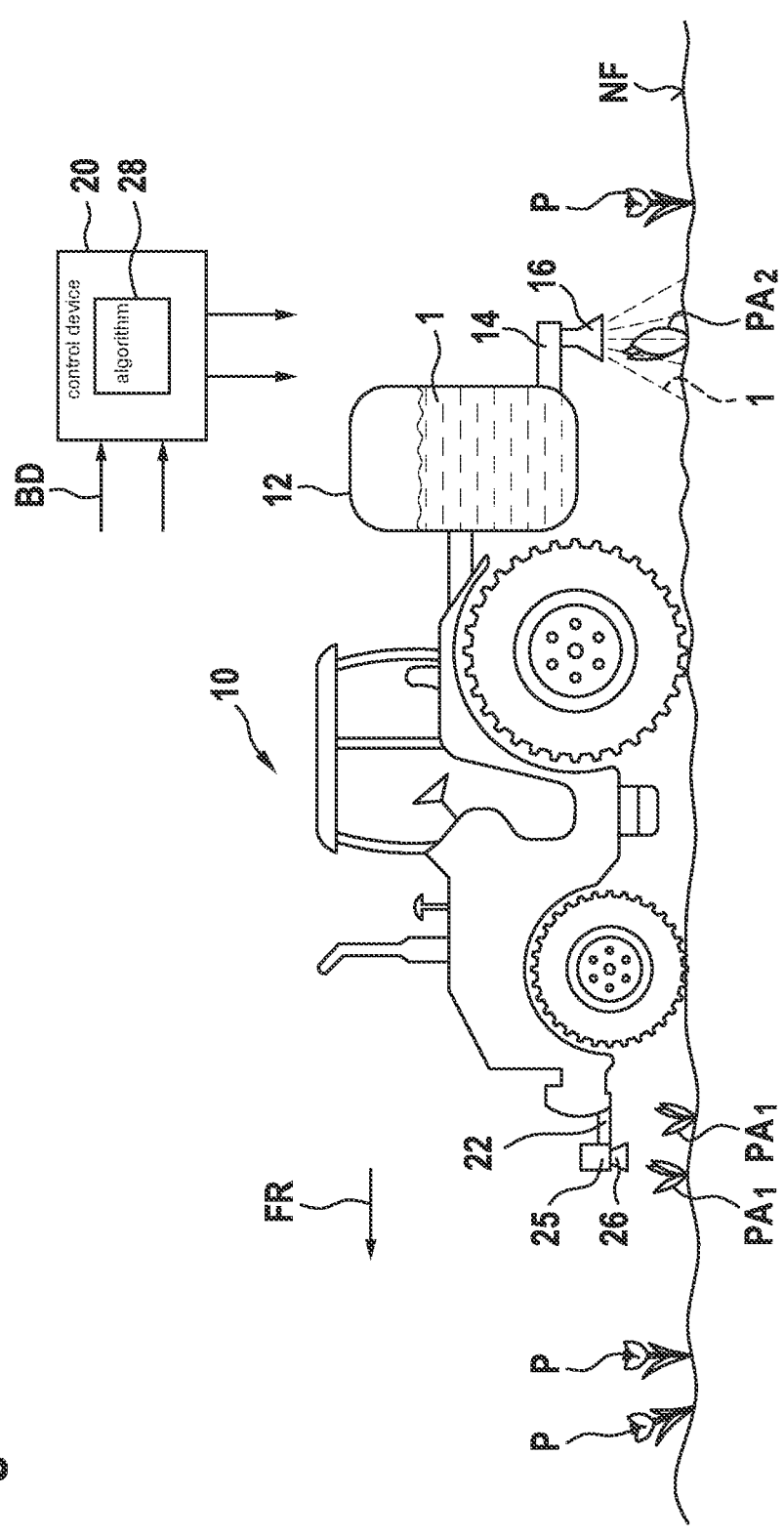
FIG. 1 shows a simplified side view of an agricultural vehicle during travel over a useable agricultural surface covered with plants, according to an example embodiment of the present invention.

Similar elements or elements having the identical function are provided with the same reference numerals in the figures.

FIG. 1 illustrates an agricultural vehicle 10 in the form of a tractor or the like which travels along a useable surface NF in a travel direction FR. Plants P that may be differentiated into at least two plant types $PA_1$ and $PA_2$ are situated on useable surface NF. First plant type $PA_1$ preferably involves crops that have been sown on useable surface NF in the form of parallel plant rows PR, or that grow there. In contrast, second plant type $PA_2$ in particular involves weeds that are to be treated with the aid of a spray 1. For treating second plant type $PA_2$, agricultural vehicle 10 includes a supply tank 12 in the rear area that is used for storing spray 1. Also situated at the rear area of vehicle 10 is a spray unit that includes a spray rack 14 that extends transversely with respect to travel direction FR of vehicle 10, i.e. perpendicularly to the plane of the drawing in FIG. 1. In the longitudinal direction of spray rack 14, the spray rack includes spray nozzles 16, as is conventional, that are spaced apart at uniform horizontal distances, for example, and that may be selectively activated by a vehicle-internal control device 20 to allow plants P of second plant type $PA_2$, situated in the spray area of particular spray nozzle 16, to be sprayed with spray 1. For this purpose, spray nozzles 16 are also connected, in a conventional manner, to supply tank 12 via valve devices and liquid lines (not illustrated).

For detecting plants P or for distinguishing between the two different plant types $PA_1$ and $PA_2$, by way of example a detection unit 25 that is fastened to a boom 22 is also provided at the front area of agricultural vehicle 10.

Detection unit 25 includes by way of example multiple identical or similar optical and/or infrared recording units 26, which are likewise spaced apart at uniform horizontal distances, perpendicularly with respect to the plane of the drawing in FIG. 1, and which by way of example may in each case detect a certain partial area of useable surface NF traveled over by agricultural vehicle 10 in the region of the area that is treatable by spray nozzles 16. Recording units 26 in each case generate, for example at uniform time intervals (optionally as a function of speed), image data BD which are supplied to control device 20 as an input variable. Control device 20, which is typically supplied with additional data as an input variable, includes, among other things, an evaluation device including an algorithm 28, in particular in the form of a computer program product, that is designed to analyze image data BD with regard to the occurrence of the two plant types $PA_1$ and $PA_2$.

Figure 2:
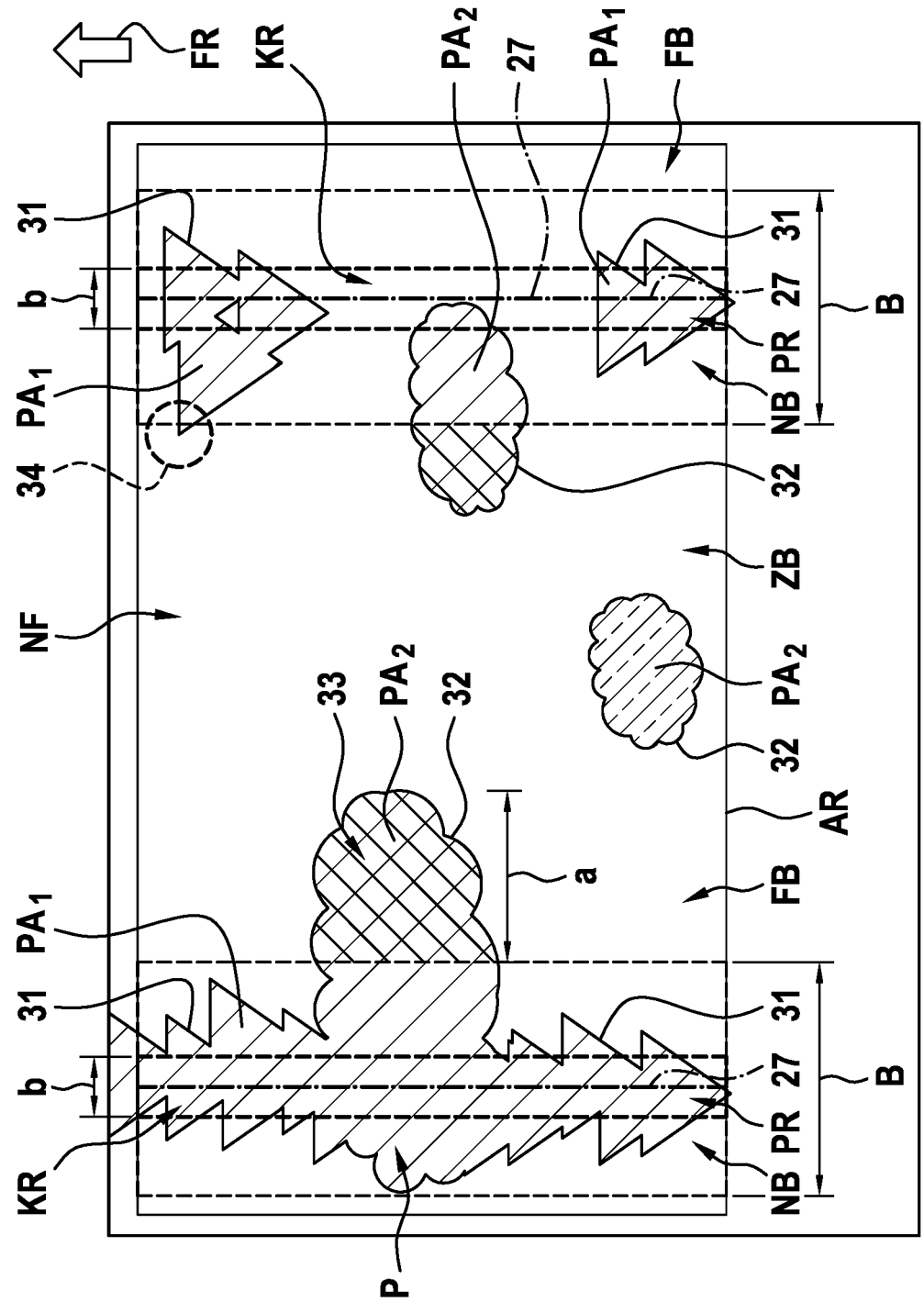
FIGS. 2 and 3 each show a simplified illustration of image recordings of a detection unit while traveling over the useable surface according to FIG. 1, for explaining an evaluation method.

As explained above, plants P of first plant type $PA_1$ are characterized in that they are situated in the form of plant rows PR on useable surface NF or grow thereon. FIG. 2 illustrates that two plant rows PR have been detected within a recorded image of detection unit 25 or of one or multiple recording units 26 in the area of an evaluation region AR during travel over useable surface NF. A detection of a plant row PR takes place by detecting plant row center lines 27, illustrated by dash-dotted lines in the figures. A cultivation row tube KR having a fixed width b in control device 20 or algorithm 28 is generated around plant row center lines 27 together with plant rows PR. Situated in each case around the area of the two cultivation row tubes KR is a neutral area NB, which directly adjoins the longitudinal sides and encloses plant area PR or cultivation row tube KR in the shape of a tube, with a (total) width B (including width b of cultivation row tube KR).

Width b of cultivation row tube KR and also width B of neutral area NB are adapted as a function of first plant type $PA_1$, the growth size (of first plant type $PA_1$), and the growth level (i.e., the point in time of the growing period of first plant type $PA_1$), and stored as appropriate values in algorithm 28 of control device 20.

Neutral area NB in turn is directly enclosed by a far area FB (in the shape of a tube). In the case of two plant row tubes PR situated in parallel to one another according to FIGS. 2 and 3, the two far areas FB on the mutually facing sides of the two plant rows PR form a shared intermediate area ZB.

FIG. 2 illustrates plants P or plant components assigned to first plant type $PA_1$ via linear or triangular outlines 31. In contrast, plants P or plant components assigned to second plant type $PA_2$ are denoted by curved or arched outlines 32. The detection of plant type $PA_1$ or $PA_2$ takes place using (image) evaluation methods that are customary or described in the related art, which for example detect the shape or outlines, the color, or other characteristic features regarding first and second plant types $PA_1$ and $PA_2$.

For left cultivation row tube KR, it is apparent in FIG. 2 that plants P or plant components extend from cultivation row tube KR into neutral area NB, and from there extend partially into far area FB. Plants P or plant components that protrude into far area FB and that are associated with cultivation row tube KR are evaluated in cross-hatched area 33, in particular with regard to the surface area of cross-hatched area 33 and/or width a in far area FB and/or the height extending perpendicularly with respect to the plane of FIG. 2 and/or the incremental distance between individual plants P or plant components, to allow first plant type $PA_1$ or second plant type $PA_2$ in far area FB to be deduced.

In the illustrated implementation area, the evaluation by evaluation device 26 or algorithm 28 has revealed plants P or plant components protruding into far area FB are to be assigned to second plant type $PA_2$. Since these plants P or plant components also protrude up into (left) cultivation row tube KR, (left) cultivation row tube KR and also the areas of plants P in neutral area NB and in far area FB denoted by outline 32 are treated with spray 1 as a precaution.

In intermediate area ZB between the two cultivation row tubes KR, also apparent in FIG. 2 is an outline 32 of a second plant type $PA_2$ situated in isolation from the two neutral areas NB and the two cultivation row tubes KR. The area of this second plant type $PA_2$ is likewise treated with spray 1.

With regard to right plant row PR in FIG. 2, an outline 32 of a second plant type $PA_2$ is apparent in a middle area, which extends from right cultivation row tube KR, across neutral areas NB, and up into far area FB. Here as well, the area of outline 32 protruding into far area FB is initially evaluated by algorithm 28 of control device 20. Since in this case, although detected second plant type $PA_2$ protrudes up into cultivation row tube KR, but in the longitudinal direction of cultivation row tube KR is not associated with other plants P of first plant type $PA_1$, entire outline 32 of second plant type PA$_2$ from cultivation row tube KR, across neutral area NB, and up into far area FB is treated with spray 1.

In addition, a further area is denoted by circle 34 in the upper area of FIG. 2, in which a plant P that protrudes from cultivation row tube KR, across neutral area NB, and up into far area FB has been detected. Here, in particular the area of circle 34 is detected via suitable evaluation methods to allow a deduction as to whether, as illustrated, this is first plant type PA$_1$, which is not treated with spray 1, or second plant type PA$_2$.

Figure 3:
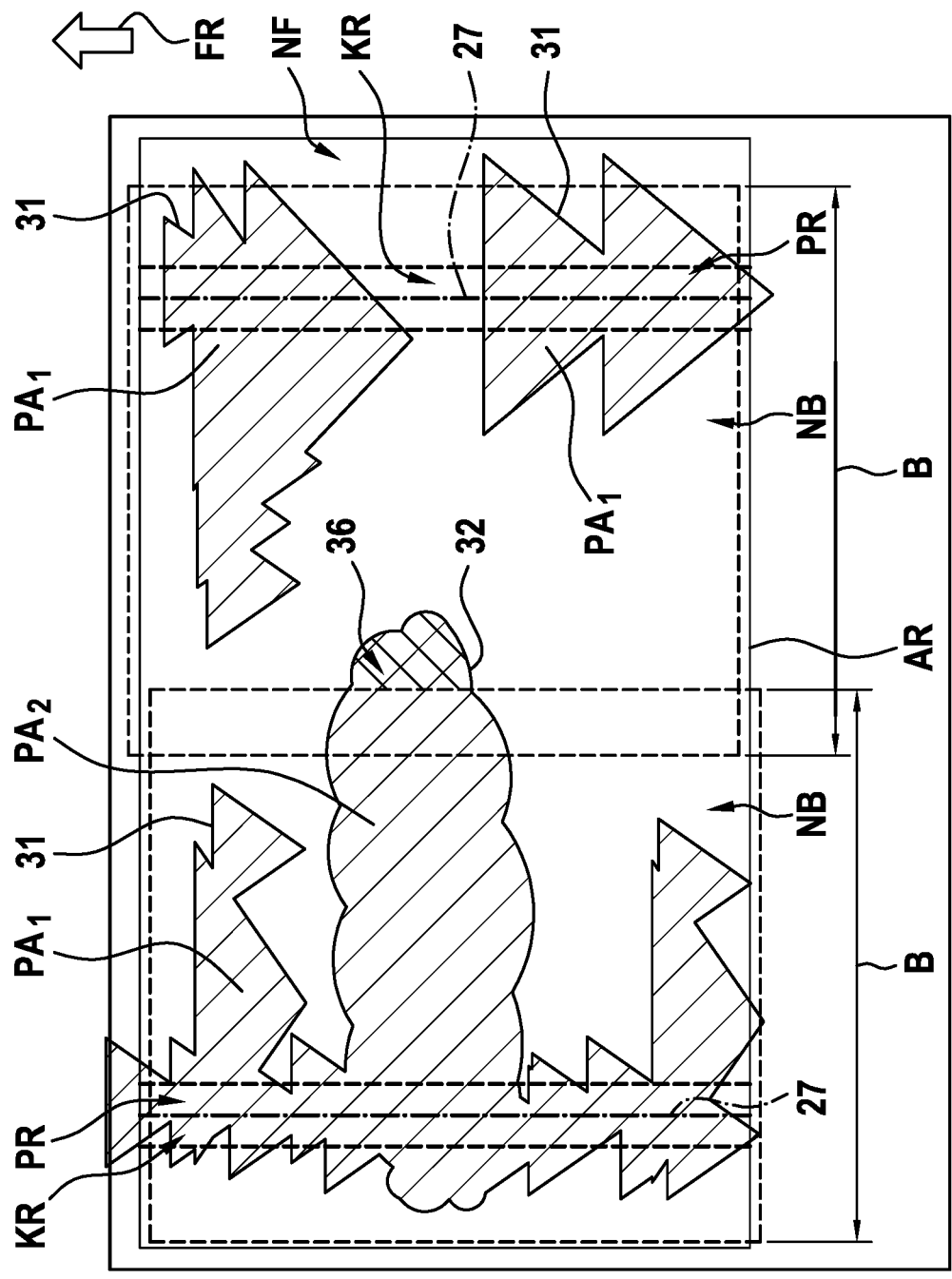

It is illustrated in FIG. 3 that the two cultivation row tubes KR include no far area FB, since width B of the two neutral areas NB is large enough that each of the neutral areas extends up into neutral area NB of the other, adjacently situated cultivation row tube KR; i.e., the two neutral areas NB intersect or overlap. In this case, the area situated outside particular neutral area NB of cultivation row tube KR is regarded as far area FB, although at the same time it forms neutral area NB of adjacently situated cultivation row tube KR.

This is apparent in particular from cross-hatched area 36 of left cultivation row tube KR in FIG. 3, which extends across neutral area NB of left cultivation row tube KR up into neutral area NB of right cultivation row tube KR, and which has been detected as second plant type PA$_2$. In contrast, for right cultivation row tube KR in FIG. 3, it is apparent that all plants P that are situated within cultivation row tube KR and its assigned neutral area NB have been identified as assigned to first plant type PA$_1$.

The described method or the device may be altered or modified in various ways without departing from the concept according to the present invention.

What is claimed is:

1. A method for classifying plants, the method comprising the following steps:

detecting the plants or plant components of the plants in an evaluation region using an optical and/or infrared detection unit;

evaluating detected image data of the detection unit using an algorithm, wherein, via the evaluation, a first plant type is distinguished from a second plant type; and treating the second plant type with a medium;

wherein the first plant type is planted in the form of a plant row in a tubular cultivation row tube, the cultivation row tube having a first predetermined width, and the method further comprises:

generating, around the cultivation row tube, a neutral area that encloses the cultivation row tube in a shape of a tube at its longitudinal sides, the neutral area having a second predetermined width; and generating, around the neutral area, a far area that encloses the neutral area at its longitudinal sides;

wherein those of the plants or plant components that are situated within the neutral area and that are associated with the plants or plant components situated within the cultivation row tube are classified as the first plant type, and those of the plants or plant components that extend from the cultivation row tube, across the neutral area, and into the far area are analyzed based on further features in the far area in order to classify the plants or plant components either as the first plant type or as the second plant type.

2. The method as recited in claim 1, wherein the plant components include leaves, and the medium is a liquid spray.

3. The method as recited in claim 1, wherein the further features include a geometric dimension of the plants in the far area, including a size of a surface area covered by the plants in the far area and/or a height, and the plants or plant components are assigned to the first plant type when the size of the surface area and/or the height of the plants or plant components is below a limiting value.

4. The method as recited in claim 1, wherein all of the plants or plant components that are associated with the plants or plant components that protrude into the far area are classified as the second plant type when the plants or plant components that protrude into the far area are classified as the second plant type.

5. The method as recited in claim 1, wherein all of the plants or plant components that are situated within the neutral area and that are not associated with the plants or plant components situated within the cultivation row tube are classified as the second plant type.

6. The method as recited in claim 1, wherein a width of the cultivation row tube and a width of the neutral area are adapted as a function of the first plant type, a growth size, and a growth level.

7. The method as recited in claim 1, wherein the detection unit is moved in a longitudinal direction of the cultivation row tube.

8. The method as recited in claim 1, wherein image data from two evaluation regions that are evaluated in succession partially overlap one another.

9. A device which is part of an agricultural vehicle, comprising:

an optical and/or infrared detection unit; and a control device including an algorithm, the control device configured to classify plants, the control device configured to:

detect the plants or plant components of the plants in an evaluation region using the detection unit;

evaluate detected image data of the detection unit using the algorithm, wherein, via the evaluation, a first plant type is distinguished from a second plant type; and treat the second plant type with a medium;

wherein the first plant type is planted in the form of a plant row in a tubular cultivation row tube, the cultivation row tube having a first predetermined width, and the control device is further configure to:

generate, around the cultivation row tube, a neutral area that encloses the cultivation row tube in a shape of a tube at its longitudinal sides, the neutral area having a second predetermined width; and generate, around the neutral area, a far area that encloses the neutral area at its longitudinal sides;

wherein those of the plants or plant components that are situated within the neutral area and that are associated with the plants or plant components situated within the cultivation row tube are classified as the first plant type, and those of the plants or plant components that extend from the cultivation row tube, across the neutral area, and up into the far area are analyzed based on further features in the far area in order to classify the plants or plant components either as the first plant type or as the second plant type.

10. The device as recited in claim 9, further comprising:

a spray unit including at least one selectively activatable spray nozzle for treating plants or plant components of the second plant type.

11. The device as recited in claim 9, wherein all of the plants or plant components that are situated within the neutral area and that are not associated with the plants or plant components situated within the cultivation row tube are classified as the second plant type.

12. A non-transitory data medium on which is stored a computer program for classifying plants, the computer program, when executed by a computer, causing the computer to perform the following steps:

detecting the plants or plant components of the plants in an evaluation region using an optical and/or infrared detection unit;

evaluating detected image data of the detection unit using an algorithm, wherein, via the evaluation, a first plant type is distinguished from a second plant type; and treating the second plant type with a medium;

wherein the first plant type is planted in the form of a plant row in a tubular cultivation row tube, the cultivation row tube having a first predetermined width, and wherein the computer program, when executed by the computer, further causes the computer to perform the following steps:

generating, around the cultivation row tube, a neutral area that encloses the cultivation row tube in a shape of a tube at its longitudinal sides, the neutral area having a second predetermined width; and generating, around the neutral area, a far area that encloses the neutral area at its longitudinal sides;

wherein those of the plants or plant components that are situated within the neutral area and that are associated with the plants or plant components situated within the cultivation row tube are classified as the first plant type, and those of the plants or plant components that extend from the cultivation row tube, across the neutral area, and up into the far area are analyzed based on further features in the far area in order to classify the plants or plant components either as the first plant type or as the second plant type.

13. The non-transitory data medium of claim 12, wherein all of the plants or plant components that are situated within the neutral area and that are not associated with the plants or plant components situated within the cultivation row tube are classified as the second plant type.

\* \* \* \* \*